Oct. 15, 1968    B. W. MOGOLIS    3,405,856
STOCK FEEDER
Filed Aug. 11, 1966

INVENTOR.
Bruce W. Mogolis
BY
WILSON, SETTLE, BATCHELDER
ATT'YS.    & CRAIG

United States Patent Office 3,405,856
Patented Oct. 15, 1968

3,405,856
STOCK FEEDER
Bruce W. Mogolis, 7313 Jonathon Ave.,
Dearborn, Mich. 48126
Filed Aug. 11, 1966, Ser. No. 571,855
10 Claims. (Cl. 226—154)

ABSTRACT OF THE DISCLOSURE

Feeding apparatus for advancing rod-like stock to a machine and which includes rotatable discs disposed on opposite sides of the stock with at least one disc biased to a position spaced from the stock. Means are provided for intermittently moving the latter disc into engagement with the stock causing the rotation of the discs to advance the stock along a predetermined path.

Background of the invention

This invention relates to stock handling apparatus and more particularly to improved apparatus for intermittently feeding elongated rod-like stock longitudinally to a desired position, as in the advancements of rod stocks into a machine tool.

In the art of machine tooling, a power driven chuck or collet holds and rotates a projected length of stock while it is being machined or cut to a desired length or shape. After a first length of stock is cut from the stock, the stock must be longitudinally advanced to bring a new portion thereof into position for a subsequent operation. It is, of course, readily apparent that while the stock is being fed into the machine the operative cycle of the machine must be stopped. Therefore, it is extremely important that the stock be advanced as rapidly as possible.

Summary of the invention

The primary object of the present invention is to provide improved apparatus for rapidly feeding stock to a machine tool.

Another object of the invention is to provide stock feeding apparatus which can readily be moved into and out of frictional gripping relationship with the stock.

A further object of the invention is to provide improved feeding mechanism for feeding bar stock including a pair of spaced gripping elements mounted on a constantly rotating shaft which may be rapidly and automatically moved into temporary driving contact with the stock in timed sequence with a machine tool.

The foregoing and other objects are achieved in a stock feeding apparatus wherein a pair of feeding elements, having opposed surfaces supported in face-to-face relationship with each other, are supported upon a rotating shaft with the feeding elements disposed on opposite sides of bar stock to be fed into a machine. Both of the elements are coupled to the shaft for rotation therewith and one of the elements is fixedly secured to the shaft so that its surface rotates in a fixed plane perpendicular to the axis of the shaft and parallel to the movement of the bar stock. The other element is capable of limited axial movement along the shaft, into and out of contact with the stock being fed. Means are provided for intermittently urging the movable element towards and into frictional engagement with the stock. The movable feeding element is mounted to have the stock contacting surface in substantially parallel relation to the longitudinal movement of the stock at all times.

Other objects and features of the invention will become apparent by reference to the following specification and to the drawings.

Figure 1:
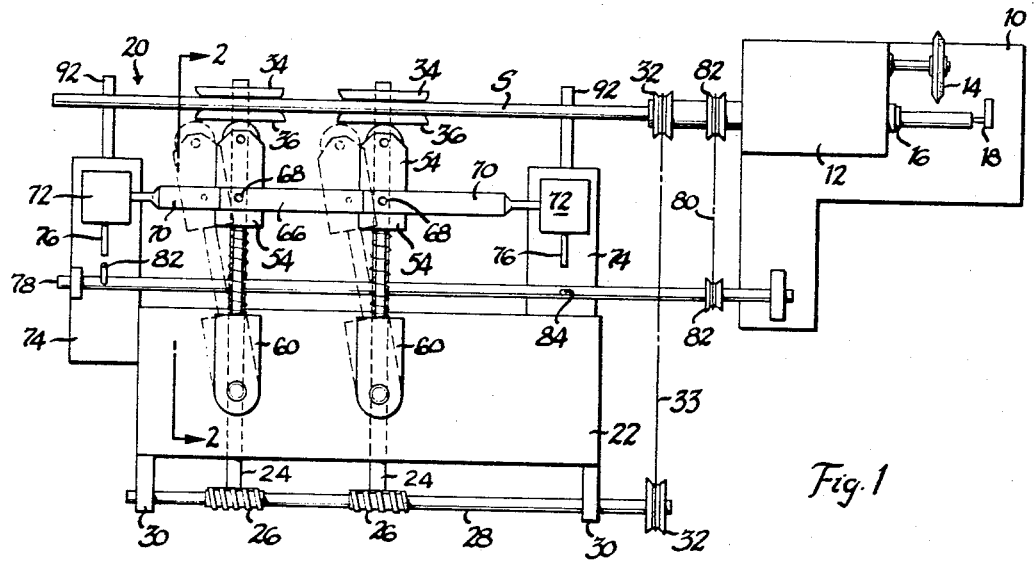
Figure 2:
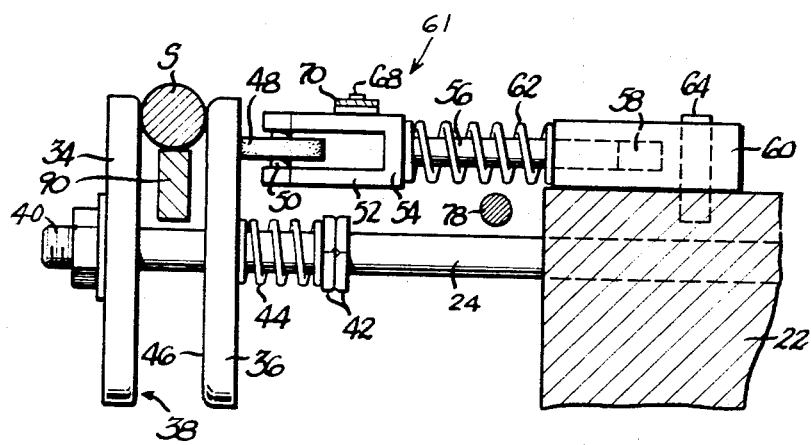

In the drawings:
FIGURE 1 is a plan view of the feeding apparatus of the invention, shown in driving engagement with the bar stock being fed to a machine tool; and
FIGURE 2 is a vertical cross sectional view along lines 2—2 of FIGURE 1 showing details of the feeding mechanism of the invention.

In the illustrated embodiment, the stock feeder of the present invention is shown in operative position upon a machining tool, which is shown for purposes of illustration only and not for purpose of limiting the invention. FIGURE 1 shows a conventional machining tool comprising a base 10, a head stock 12, and machining element 14, such as a cutter, which is supported on the head stock and adapted to be moved into and out of engagement with the bar stock S by suitable means (not shown). A chuck or collet 16 holds and rotates the bar stock S. Suitable power means (not shown) are provided for rotating the chuck and the cutting member. The bar stock S is advanced from left to right through the head stock 12 and chuck 16 into engagement with a fixed stop 18 supported above the base 10. The stock is advanced by the feeding mechanism 20 constructed in accordance with the present invention.

Although only one feeding member is required for feeding the bar stock into the machine, in the illustrated embodiment of the feeding mechanism, two feeding members are shown in spaced relationship longitudinally along the path. Therefore, when one bar is used up, a new bar may be dropped into longitudinal alignment with the first bar from a magazine (not shown) to be advanced by the first feeding member while the second feeding member is advancing the first bar stock.

The feeding mechanism 20 of the present invention includes a support 22 which may be secured to the floor or directly to the machining tool. The support is provided with a pair of spaced parallel openings, each of which rotatably receives a shaft 24 having a drive gear (not shown) secured to one end which is in driving engagement with a sprocket 26 mounted on a shaft 28. The shaft 28 is rotatably mounted on the support by suitable bearing members 30 and may be rotated by the same power source which rotates the chuck 16. In the illustrated embodiment, this is accomplished by a pair of pulleys 32, one being mounted on the free end of the shaft 28 while the second is mounted on an extension of the driving mechanism driving the chuck and the two pulleys are interconnected with a belt 33.

The opposite ends of the shaft 24 are each provided with a pair feeding elements 34 and 36 mounted for rotation with the shaft 24. The feeding element or disc 34 is fixed on the shaft and has a surface 38 which is rotated in parallel relation to the longitudinal advancement of the bar stock and may be in frictional engagement therewith at all times. The second feeding element 36 is mounted for axial movement along the shaft 24. For this purpose, the shaft 24 has a threaded portion 40 which receives a pair of lock nuts 42 and one of the lock nuts 42 has one end of a tension spring 44 secured thereto. The opposite end of the tension spring is connected to the second feeding element or disc 36. The spring 44 is of suitable length so that in its relaxed position it will tend to maintain the disc 36 in spaced relationship from the bar stock S at all times.

Means are provided for intermittently urging the movable feeding element or disc 36 towards and into frictional engagement with the bar stock, which will then advance the bar stock from left to right in FIGURE 1. According to the invention, the means for intermittently urging the movable disc into engagement with the bar stock includes a roller 48 rotatably mounted on a shaft 50 extending between the legs 52 of a yoke 54. The web of the yoke 54 threadedly receives a rod 56 which has the opposite free end slidable in an opening 58 of a block 60. A compression spring 62 is telescoped on the rod 56 with one end engaging a surface of the web of the yoke 54 and opposite end engaging a surface of the block 60. The compression spring is adapted to constantly urge the yoke and the roller toward the movable disc 36.

The shaft 50, yoke 54, rod 56, spring 58, and block 60 form a member 61 for moving the associated roller 48 between first and second positions. For this purpose, each member 61 is adapted to be pivoted upon the support 22, and in the illustrated embodiment the pivot point for each member supporting a roller is a stud 64, which projects above the upper surface of the support 22, and is received in an opening of the block 60 so that the roller 48 will pivot about the stud 64.

In operation, the rollers 48 are adapted to be moved from a first or inactive position, shown by the dotted lines of FIGURE 1 to the second or active position shown by the solid lines of FIGURE 1. Various means may be utilized for moving the rollers and associated elements between the first to the second positions. In the illustrated embodiment, this movement is imparted by interconnecting the spaced yokes 54 with a bar 66 which is pivoted on a pin 68 extending above each of the yokes 54. Each of the pins 68 pivotally receives or has mounted thereon a second bar 70 which has its free end extending into a solenoid 72, supported on a plate 74 extending from the support 22, and each solenoid is provided with an actuating finger 76. A shaft 78, which is driven by a belt 80 entrained over pulleys 82, is utilized for activating the respective solenoids in desired sequence. For this purpose, the shaft 78 has a pair of radially and axially spaced pins 84 projecting from the shaft, one of which is in alignment with each of the fingers 76 of solenoids 72. Therefore, clockwise rotation of the shaft will first activate the solenoid 72 shown in the left hand side of FIGURE 7 to move the rollers and associated elements to the position shown in the solid lines of FIGURE 1. Continued clockwise rotation of the shaft 78 will cause the second pin 84 to engage the finger 76 of the right hand solenoid 72 to move the rollers 48 and associated elements to the inoperative position shown by the dotted lines of FIGURE 1. It of course will be appreciated that the length of time which the rollers are in the active position will be determined by the radial spacing of the respective pins 84 and the speed of rotation of the shaft 78. While an illustrative embodiment of the actuating means has been described, it is readily apparent other moving means may be utilized without departing from the spirit of the invention.

In operation, the shafts 24 are continually rotated thereby rotating the spaced pairs of discs 34 and 36. The rollers 48 and associated elements will be in a position shown by the dotted lines of FIGURE 1 so that the discs 36 are moved to a spaced position from the rod S by the respective tension springs 44. Upon activation of the solenoid 72 on the left hand side of FIGURE 1, the rollers 48 will be moved to the active position thereby forcing the discs 36 into frictional engagement with the bar stock S which will casue the stock to move towards the right, as viewed in FIGURE 1, into engagement with the stop 18. Continued rotation of the shaft 78 will cause the pin 84 to engage the finger 76 associated with the solenoid 72, shown on the right hand portion FIGURE 1, to move the rollers 48 to the inactive position shown in the dotted lines of FIGURE 1.

When in the active position, the rollers 48 may apply excessive pressure to the discs 36 due to various causes, such as change in diameter or size of the bar stock. However, any excess pressure will be relieved through the compression springs 62. In this manner; the pressure applied by the rollers 48 to the discs 36 will at all times remain substantially constant.

The illustrative embodiment of the invention also includes means for maintaining the bar stock in a vertical position in alignment with the chuck 16. By way of example, a bar 90 is disposed between the spaced discs 34 and 36 and held in desired vertical position by a pair of spaced support members 92 extending from plates 74. The bar may be vertically adjustable (not shown) on the support members 92 to accommodate varying sizes of bar stock. This arrangement will prevent the stock from moving toward the axis of the discs while they are moving the stock into the machine.

In actual use, the stock feeding apparatus constructed in accordance with this invention has been found to almost double the length of stock being fed into a machining tool than has heretofore been possible with prior art feeding apparatus, known to the applicant, in the same period of time.

While one embodiment of the invention has been described in detail, it will be apparent to those skilled in the art that the disclosed embodiment may be modified. Therefore, the foregoing description is to be considered exemplary rather than limiting and the true scope of the invention is that defined in the following claims.

I claim:

1. Stock feeding apparatus for feeding elongated stock along a predetermined path, comprising a shaft mounted for rotation about an axis perpendicular to and offset from said predetermined path, a pair of feeding elements mounted on said shaft for rotation therewith and disposed on opposite sides of the stock, urging means intermittently activated for urging said elements towards each other to frictionally engage the stock, said urging means including engaging means pivoted at a point spaced from said feeding elements and engaging one of said feeding elements and means for moving said engaging means about said pivot point to move one of said feeding elements and drive means for rotating said shaft to cause said elements to advance the stock when engaged by said elements.

2. Stock feeding apparatus as defined in claim 1, wherein one of said elements is fixed on said shaft and engaging the stock and the second element is mounted for intermittent movement axially along said shaft from a first position spaced from the stock to a second position engaging the stock.

3. Stock feeding apparatus as defined in claim 2, including resilient means for maintaining said second element in said first position and adapted to allow said second element to move to said second position when said urging means is activated.

4. Stock feeding apparatus as defined in claim 3, wherein said feeding elements are discs having substantially flat surfaces facing the stock and said resilient means maintains said movable disc surface substantially parallel to said fixed surface in both the first and second positions.

5. Stock feeding apparatus as defined in claim 1, including a second shaft spaced from and mounted for rotation parallel to said first shaft, a second pair of feeding elements carried by said second shaft for rotation therewith and disposed on opposite sides of the stock, and wherein said urging means includes second engaging means pivoted at a point spaced from and engaging one of said second pair of feed elements and said means for moving simultaneously urges both pairs of feeding elements towards each other to frictionally engage the stock and said drive means rotates both of said shafts.

6. Stock feeding apparatus as defined in claim 5, wherein said urging means includes a pair of rollers each engaging one of said pairs of feeding elements, means mounting each of said rollers at points spaced from each feeding element, means pivotally interconnecting said mounting means and activating means for simultaneously moving said rollers about said pivot points to move the pairs of feeding elements towards each other.

7. Stock feeding apparatus as defined in claim 1, in which said engaging means includes a roller rotatable on an axis spaced from said pivot point for engaging said one of said feeding elements.

8. Stock feeding apparatus as defined in claim 7, wherein said member includes resilient means between said roller and the pivot point for absorbing excess pressure on said roller.

9. Stock feeding apparatus for feeding elongated stock along a predetermined path comprising; first and second shafts rotatable on spaced parallel axis disposed perpendicular to said path, drive means for rotating said shafts, first discs fixedly secured to the respective shafts for rotation therewith, second discs respectively rotatable with said shafts and axially movable on the respective shafts, said first discs being located on one side of said stock and said second discs being located on an opposed side of said stock and normally spaced from said stock, and means intermittently urging said second discs into engagement with said stock to advance said stock along said path, said last means comprising a pair of rollers operatively interconnected for simultaneous movement along arcuate paths adjacent said second discs and each having a first position on said arcuate path wherein said second discs are spaced from said stock and a second position wherein said second discs engage said stock, and means for moving said rollers between said positions.

10. Stock feeding apparatus as defined in claim 9, in which said means for moving said rollers comprises first and second members having said rollers respectively rotatable on one end of each of said members, means pivotally mounting the opposite ends on axes respectively perpendicular to and along an axis of one of said shafts and biasing means forming part of each of said members allowing said rollers to move toward the respective members axes when excess force is applied to said rollers.

References Cited

UNITED STATES PATENTS

| | | | |
|---|---|---|---|
| 2,576,114 | 11/1951 | Hibbard | 226—162 |
| 2,904,168 | 9/1959 | Wall | 226—186 |
| 3,203,608 | 8/1965 | Mogolis | 226—155 |

RICHARD E. AEGERTER, *Primary Examiner.*

H. C. HORNSBY, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,405,856                                                     October 15, 1968

Bruce W. Mogolis

It is certified that error appears in the above identified patent and that said Letters Patent are hereby corrected as shown below:

Column 2, line 11, "purpose" should read -- purposes --; line 48, after "pair" insert -- of --. Column 3, line 59, "casue" should read -- cause --; line 62, after "portion" insert -- of --. Column 4, lines 33 and 34, after "elements" insert -- toward the other of said feeding elements --. Column 5, line 7, "axis" should read -- axes --.

Signed and sealed this 17th day of March 1970.

(SEAL)
Attest:

Edward M. Fletcher, Jr.                                         WILLIAM E. SCHUYLER, JR.
Attesting Officer                                                     Commissioner of Patents